US010434927B2

(12) United States Patent
Matejka et al.

(10) Patent No.: US 10,434,927 B2
(45) Date of Patent: Oct. 8, 2019

(54) ADJUSTMENT SYSTEM FOR OPTICAL ASSEMBLIES DESIGNED ESPECIALLY FOR MOTOR VEHICLE HEADLIGHTS

(71) Applicant: Varroc Lighting Systems, s.r.o., Senov u Noveho Jicina (CZ)

(72) Inventors: Zdenek Matejka, Kozlovice (CZ); Petr Ferst, Morkov (CZ); Jaroslav Tomas, Ostrava-Trebovice (CZ); Rudolf Wojcik, Koprivnice (CZ)

(73) Assignee: Varroc Lighting Systems, s.r.o., Senov U Noveho (CZ)

( * ) Notice: Subject to any disclaimer, the term of this patent is extended or adjusted under 35 U.S.C. 154(b) by 0 days.

(21) Appl. No.: 16/110,875

(22) Filed: Aug. 23, 2018

(65) Prior Publication Data

US 2019/0061602 A1    Feb. 28, 2019

(30) Foreign Application Priority Data

Aug. 29, 2017    (CZ) .................................... 2017-497

(51) Int. Cl.
*B60Q 1/068* (2006.01)
*B60Q 1/072* (2006.01)
(Continued)

(52) U.S. Cl.
CPC ............. *B60Q 1/068* (2013.01); *B60Q 1/072* (2013.01); *B60Q 1/14* (2013.01); *F16H 25/20* (2013.01); *F21S 41/60* (2018.01); *B60Q 2200/30* (2013.01)

(58) Field of Classification Search
CPC .......... B60Q 1/068; B60Q 1/072; B60Q 1/14; F21S 41/60; F16H 25/20
See application file for complete search history.

(56) References Cited

U.S. PATENT DOCUMENTS

| 6,779,912 B2 | 8/2004 | Krieg et al. |
| 7,033,053 B2 | 4/2006 | Watson et al. |

(Continued)

FOREIGN PATENT DOCUMENTS

| EP | 2719579 A2 | 4/2014 |
| FR | 2827231 | 1/2017 |

OTHER PUBLICATIONS

Search Report from Corresponding Czech Application No. PV 2017-497 dated May 16, 2018 (3 pages).

*Primary Examiner* — Joseph L Williams
(74) *Attorney, Agent, or Firm* — Hovey Williams LLP

(57) ABSTRACT

The adjustment system comprises at least one pair of adjustment apparatuses. For each optical assembly, one adjustment apparatus is adapted to turn the optical assembly around the turning axis ($\alpha$; $\beta$) independently of the other optical assembly. The adjustment system further comprises an additional adjustment apparatus connected to a first adjustment apparatus and adapted to transfer its movement to the movement of this adjustment apparatus; and a connecting member connected to the additional adjustment apparatus and to a second adjustment apparatus at the same time, and adapted to transfer the movement of the additional adjustment apparatus to the movement of the second adjustment apparatus (. If the additional adjustment apparatus is connected to the first adjustment apparatus and the connecting member is connected between the additional adjustment apparatus and the second adjustment apparatus, turning movement of one optical assembly will automatically induce a turning movement of the other optical assembly.

14 Claims, 8 Drawing Sheets

(51) Int. Cl.
  *F16H 25/20* (2006.01)
  *F21S 41/60* (2018.01)
  *B60Q 1/14* (2006.01)

(56) References Cited

U.S. PATENT DOCUMENTS

| | | |
|---|---|---|
| 2002/0054496 A1 | 5/2002 | Fujino et al. |
| 2003/0012028 A1 | 1/2003 | Krieg et al. |
| 2007/0121337 A1 | 5/2007 | Chapin et al. |
| 2014/0029278 A1 | 1/2014 | Burton |

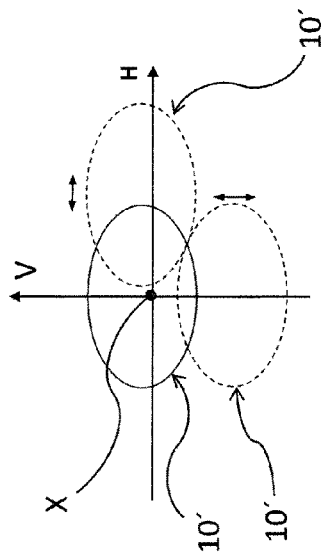
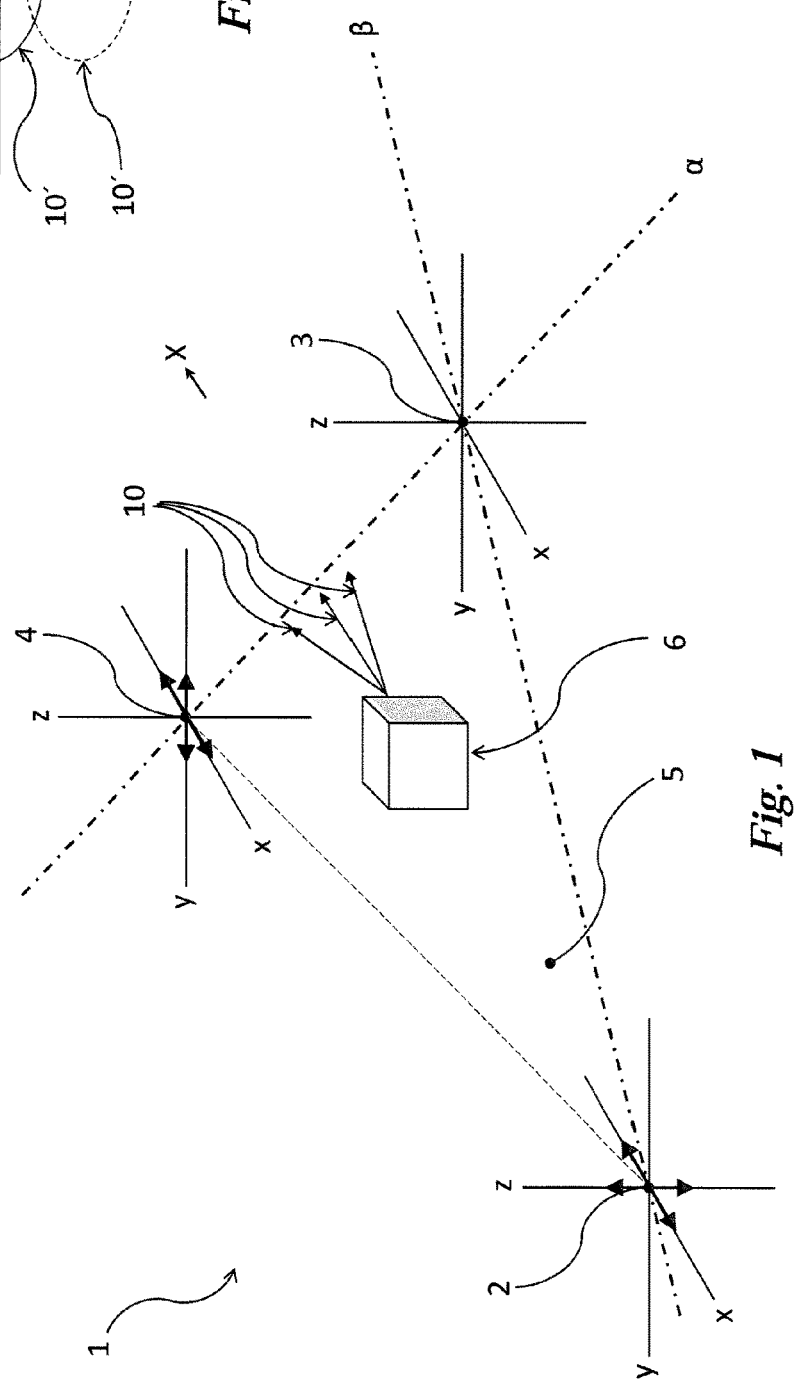
Fig. 2
Fig. 1

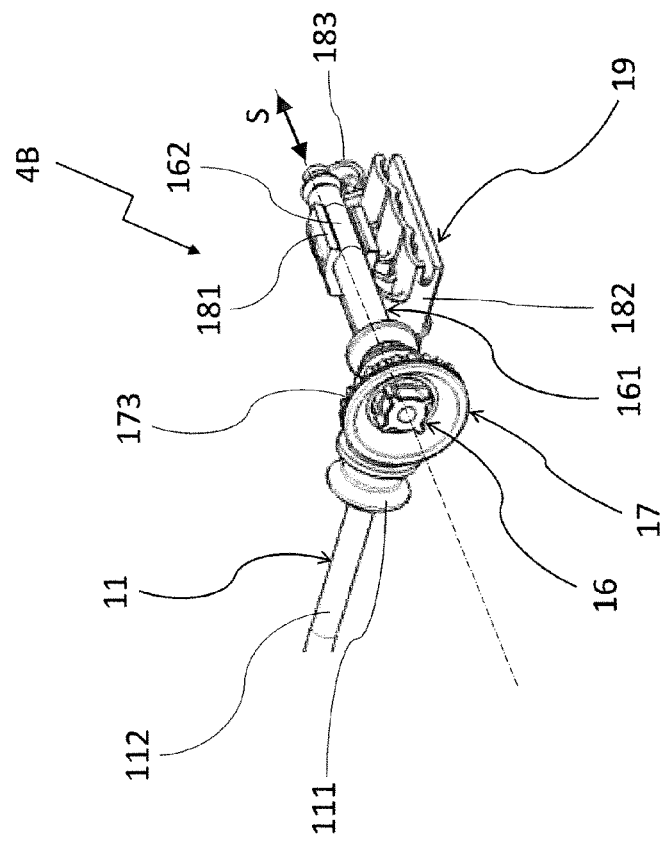
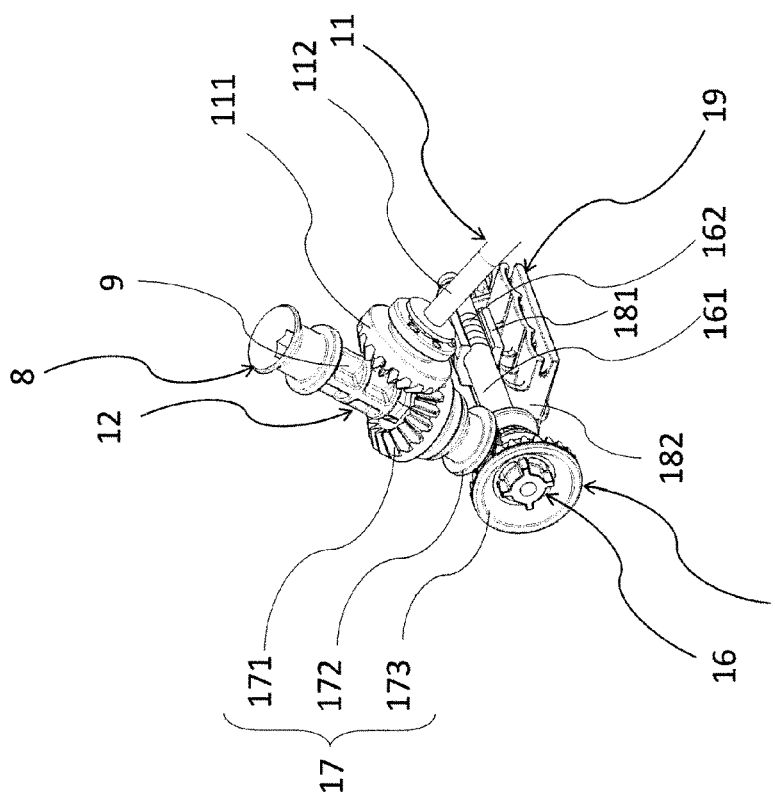
Fig. 7
Fig. 8

US 10,434,927 B2

ADJUSTMENT SYSTEM FOR OPTICAL ASSEMBLIES DESIGNED ESPECIALLY FOR MOTOR VEHICLE HEADLIGHTS

RELATED APPLICATIONS

The application claims the benefit of Czech Patent Application No. PV 2017-497 entitled "An adjustment system of optical assemblies designed especially for motor vehicle headlights", filed Aug. 29, 2017, the entire disclosure of which is incorporated herein by reference.

FIELD OF THE INVENTION

The invention relates to an adjustment system for optical assemblies designed especially for motor vehicle headlights

BACKGROUND INFORMATION

Modern headlights of motor vehicles comprise two separate optical assemblies containing a powerful light source and optical elements influencing the direction of light rays during the generation of the output light trace. They are generally the basic optical assembly to create the low-beam light trace, and an associated optical assembly to create the high-beam light trace. It means that in the case of the high beam, the light trace is created by both the light assemblies together as a compact whole.

Each optical assembly is mostly adjustable on two axes by means of a mechanical adjustment system that must be controllable from the outer side of the headlight. The adjustment of individual optical assemblies and their individual components is first carried out during the production of the headlights wherein the adjustment of individual optical assemblies depends on various design and assembly factors of the optical elements situated in the inner space of the headlight. Another adjustment is carried out during the installation of the headlight into the car body wherein the individual optical assemblies form a single optical assembly, and it is only the emission direction of light rays that is adjusted to achieve the required emission characteristic.

A number of adjustment systems of the optical assembly of headlights are known from the documents U.S. Pat. No. 6,779,912B2, US20070121337A1, US20020054496A1, KR2827231B1. The document U.S. Pat. No. 7,033,053B2 discloses a light device equipped with a light unit for the low beam and a light unit for the high beam. Both the units are connected together using an adjustment bracket that enables mutual influencing of two ball journals and reflectors of individual units. The first ball journal, the adjustment bracket and the high-beam reflector influence each other so that the vertical axis of the high-beam reflector can be parallel to the vertical axis of the reflector and the axis of the low beam. The second ball journal cooperates in a similar way with the adjustment bracket and reflector for the low beam while the low-beam and high-beam reflectors are adjusted simultaneously in the vertical direction. A disadvantage of the prior art is that adjustment of the light units for the low beam and high beam requires some installation space, which is a limiting condition especially in terms of optimal arrangement of optical elements in the inner chamber of the carrier housing and the size of the housing itself.

It is desirable to develop such an adjustment system of optical assemblies designed especially for motor vehicle headlights that will have a simple structure, will be stable and have low requirements for the handling and installation space. The adjustment system should enable both separated/stand-alone adjustment of two independent lighting modules and simultaneous/synchronous adjustment of their position.

SUMMARY OF THE INVENTION

The above-mentioned objects of the invention are fulfilled by an adjustment system of optical assemblies designed especially for motor vehicle headlights wherein each of the optical assemblies is part of a separate lighting module. The adjustment system contains at least one pair of adjustment apparatuses wherein for each of the optical assemblies, one adjustment apparatus is designed, which is adapted to turn the optical assembly around the turning axis independently of the turning of the other optical assembly, the turning axes of the optical assemblies being, in general, parallel to each other. The adjustment system further contains at least one additional adjustment apparatus that can be connected to the first of the two adjustment apparatuses and is adapted to transfer its movement to the movement of this adjustment apparatus; and a connecting member that can be connected to the additional adjustment apparatus and to the second of the two adjustment apparatuses at the same time, and is adapted to transfer the movement of the additional adjustment apparatus to the movement of the second one of the adjustment apparatuses, wherein if the additional adjustment apparatus is connected to the first one of the two adjustment apparatuses and the connecting member is connected between the additional adjustment apparatus and the second one of the two adjustment apparatuses, a turning movement of one optical assembly will automatically induce a turning movement of the other optical assembly.

In one of the embodiments, the simultaneous turning of the optical assemblies means turning by the same angle.

In one of the embodiments, the adjustment system comprises one pair of adjustment apparatuses and the turning axis is virtually horizontal.

In another one of the embodiments, the adjustment system comprises two pairs of adjustment apparatuses out of which one is adapted to turn the optical assemblies around virtually horizontal turning axes and the other one to turn them around virtually vertical turning axes. The adjustment system can comprise two connecting members.

In one of the embodiments, the connecting member is adapted to transfer the movement of the additional adjustment apparatus to the movement of the second one of the adjustment apparatuses.

In yet another one of the embodiments, the connecting member is adapted both to transfer the movement of the additional adjustment apparatus to the movement of the said second one of the adjustment apparatuses, and to transfer the movement of the second one of the adjustment apparatuses to the movement of the additional adjustment apparatus.

In one of the embodiments, the said movement of the second one of the adjustment apparatuses and the movement of the additional adjustment apparatus is a rotary movement.

The connecting member may be equipped with gears for the transfer of the rotary movement.

The connecting member can be flexible, and can be, e.g., a cable.

In another one of the embodiments, the adjustment apparatus comprises a shaft equipped at one end with a control member that can be used to set the shaft into a rotary movement in a controlled manner, the shaft being further equipped with a gear designed to transfer the torque between the additional adjustment apparatus and this adjustment apparatus, or between the adjustment apparatus and the connecting member, and in its opposite part with a thread to transfer the rotary movement of the shaft to a linear reciprocal movement of a slider. The slider can comprise a nut and a central body on the outwardly oriented end of which a ball journal is situated to transfer the linear movement of the slider to a turning movement of the optical assembly around the turning axis.

In still another one of the embodiments, both the adjustment apparatuses of the pair of adjustment apparatuses have the same structure.

In one of the embodiments, all the adjustment apparatuses included in the adjustment system have the same structure.

In one of the embodiments, the additional adjustment apparatus comprises a shaft equipped with a top gear adapted to transfer the torque to the connecting member, and a bottom gear adapted to transfer the torque to the gear of the adjustment apparatus, coupled to the control member of the adjustment assembly, the additional adjustment apparatus being fitted at its top end with a control member for controlled turning of the shaft.

BRIEF DESCRIPTION OF THE DRAWINGS

The present invention will be further clarified in more detail with the use of embodiment examples referring to the enclosed drawings where:

FIGS. 1 and 2 show the general principle of adjusting the position of the optical assembly, FIGS. 7 and 8 show embodiments of the adjustment apparatuses according to the invention.

EXAMPLES OF EMBODIMENTS OF THE INVENTION

Figure 3:
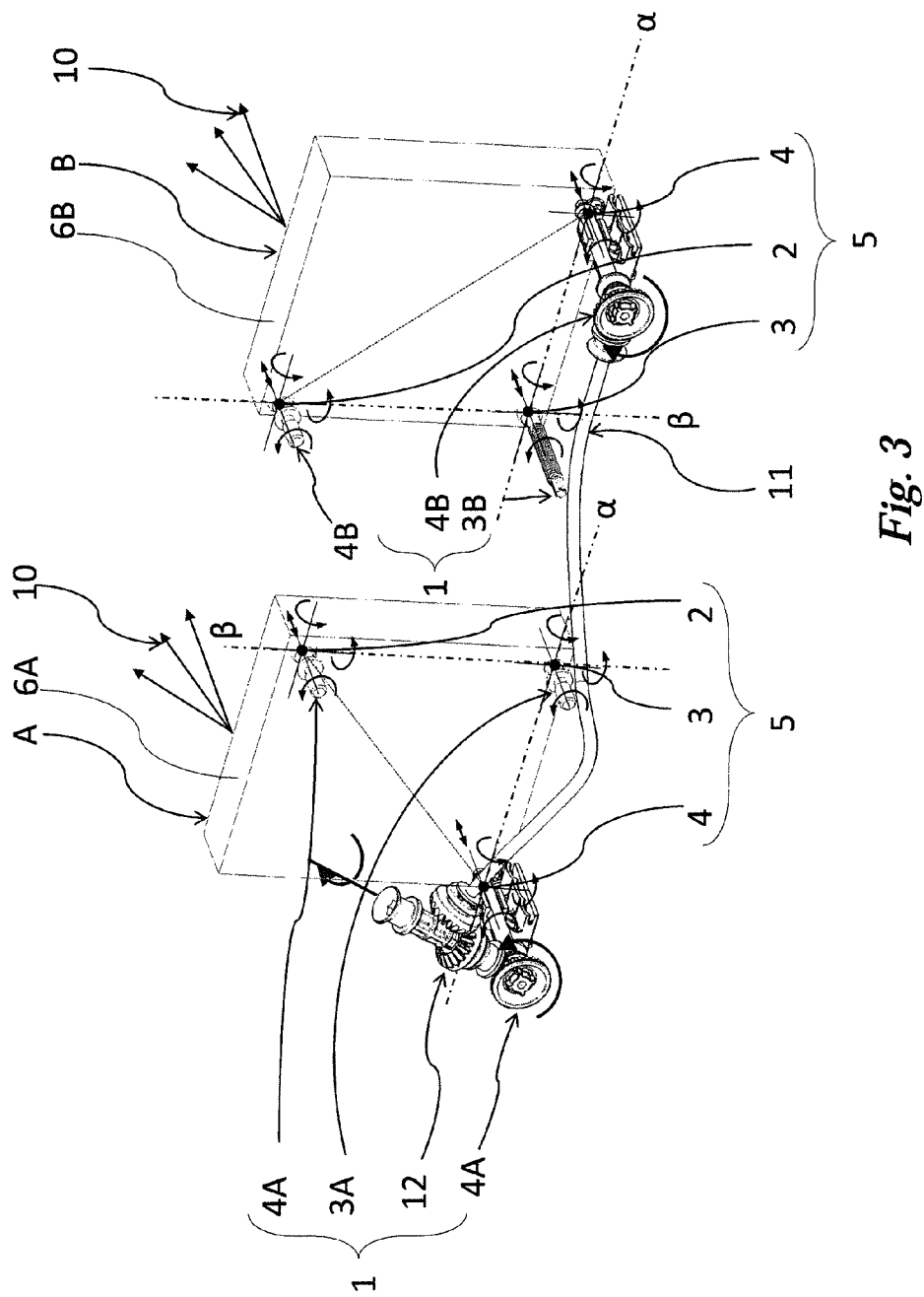
FIG. 3 shows a first embodiment of the adjustment system of optical assemblies according to the invention.

FIGS. 1 and 2 show the general principle of adjusting the position of the optical assembly. This principle is well-known from the prior art, but it is also used by this invention; however with the use of new equipment—adjustment system according to the invention. According to this principle, the headlight of a motor vehicle comprises a three-point adjustment system 1 wherein three system points 2, 3, 4 form a system triangle 5 designed to adjust and control the position of the optical assembly 6 and thus to change the direction of light rays 10 emitted by the optical assembly 6. A change of the position of the vertical system point 2 causes turning of the system triangle 5 around the height turning axis α passing through the horizontal system point 4 and the fixed system point 3. The light rays 10 producing the light trace 10' are emitted without a change in the horizontal direction H of the display plane HV, while the position of the light trace 10' changes in the vertical direction V of the display plane HV. A change of the position of the horizontal system point 4 causes turning of the system triangle 5 around the left-right turning axis β passing through the vertical system point 2 and the fixed system point 3. The light rays 10 creating the light trace 10' are emitted without a change in the vertical direction V of the display plane HV while the position of the light trace 10' changes in the horizontal direction H of the display plane HV.

FIG. 3 a the first embodiment of an adjustment system for optical assemblies designed especially for motor vehicle headlights. FIG. 3 shows two light modules A, B whose optical assemblies 6A, 6B are adapted to generate light rays 10 producing the light traces of the low-beam or high-beam light function. The first light module A can be, e.g., adapted to generate the light trace of the low-beam light function and the other light module B to generate the light trace of the high-beam light function. The position of each light module A, B is set through two adjustment systems 1, each of them comprising two adjustment apparatuses 4A/4B, an additional adjustment apparatus 12, a fixed assembly node 3A/3B arranged in two separate system triangles 5 to change the positions of the system points 2, 3, 4 and to turn the system triangles 5 around the turning axes α, β, axis α being preferably essentially horizontal and axis β essentially vertical. The adjustment apparatus 4A used to turn the first light module A in the horizontal direction is connectable by means of the additional adjustment apparatus 12 and the connecting member 11 to the adjustment apparatus 4B for turning the other light module B in the horizontal direction for coordinated turning of both the light modules A, B around the turning axes β. The structural arrangement of the adjustment apparatuses 4A, 4B and the connecting member 11 enables simultaneous turning of both the light modules A, B by the same unit.

Although the system point 3 is referred to as fixed, i.e. rigid, this point is adjustable on axis x by means of the fixed assembly nodes 3A/3B. This adjustment is carried out to ensure coupling of both the modules A and B and not within the framework of the entire turning of the optical assemblies 6A, 6B around the respective turning axes α, β therefore, point 3 is referred to as fixed.

Figure 4:
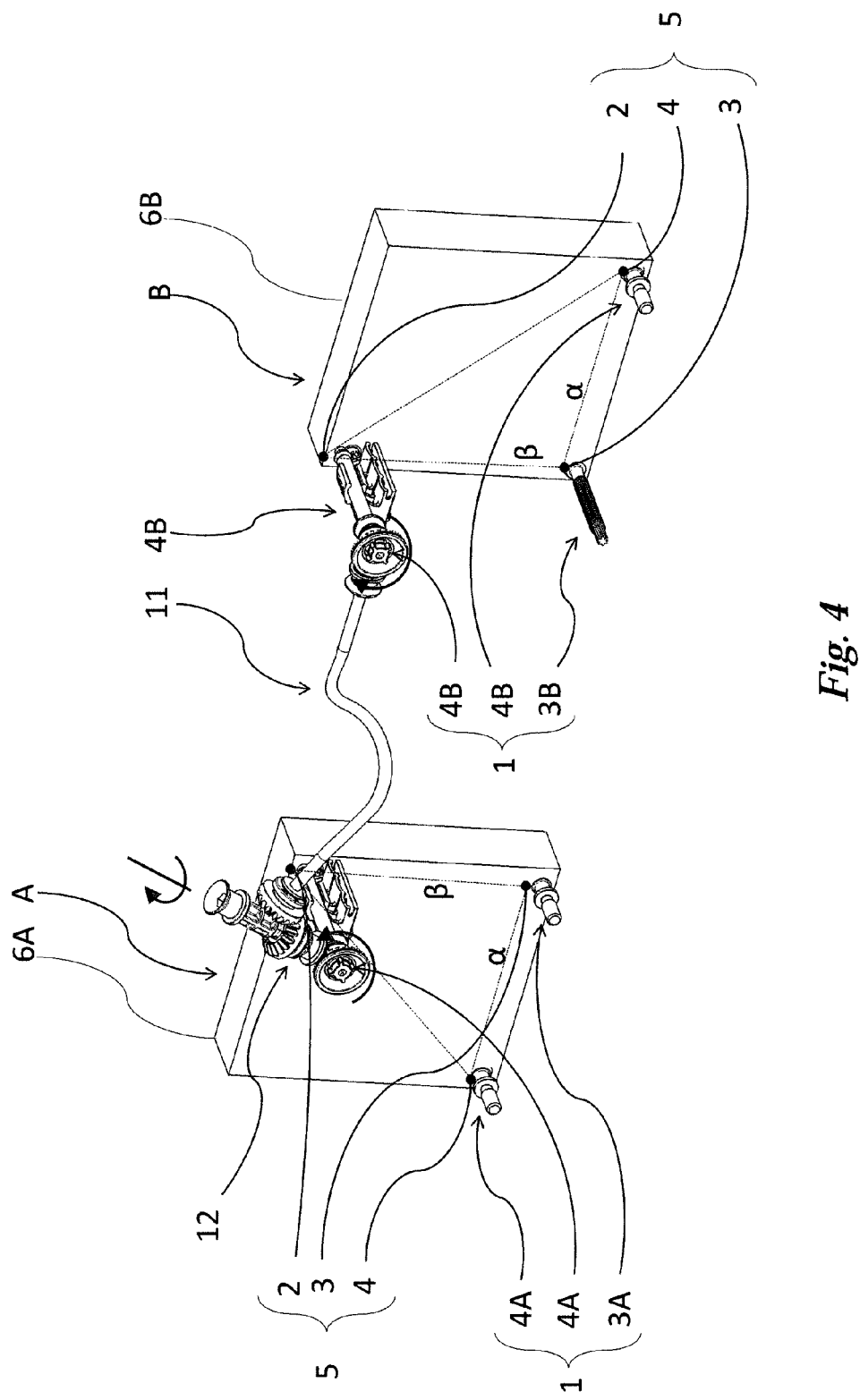
FIG. 4 shows a second embodiment of the adjustment system of optical assemblies according to the invention.

FIG. 4 shows a second embodiment of an adjustment system for optical assemblies designed especially for motor vehicle headlights. The position of each light module A, B is set through two adjustment systems 1, each of them comprising two adjustment apparatuses 4A/4B, an additional adjustment apparatus 12, a fixed assembly node 3A/3B arranged in two separate system triangles 5 to change the positions of the system points 2, 3, 4 and to turn the system triangles 5 around the turning axes α, β, axis α being preferably essentially horizontal and axis β essentially vertical. The adjustment apparatus 4A used to turn the first light module A in the vertical direction is connectable by means of the additional adjustment apparatus 12 and the connecting member 11 to the adjustment apparatus 4B for turning the other light module B in the vertical direction for coordinated turning of both the light modules A, B around the turning axes α. The structural arrangement of the adjustment apparatuses 4A, 4B and the connecting member 11 enables simultaneous turning of both the light modules A, B by the same unit.

Figure 5:
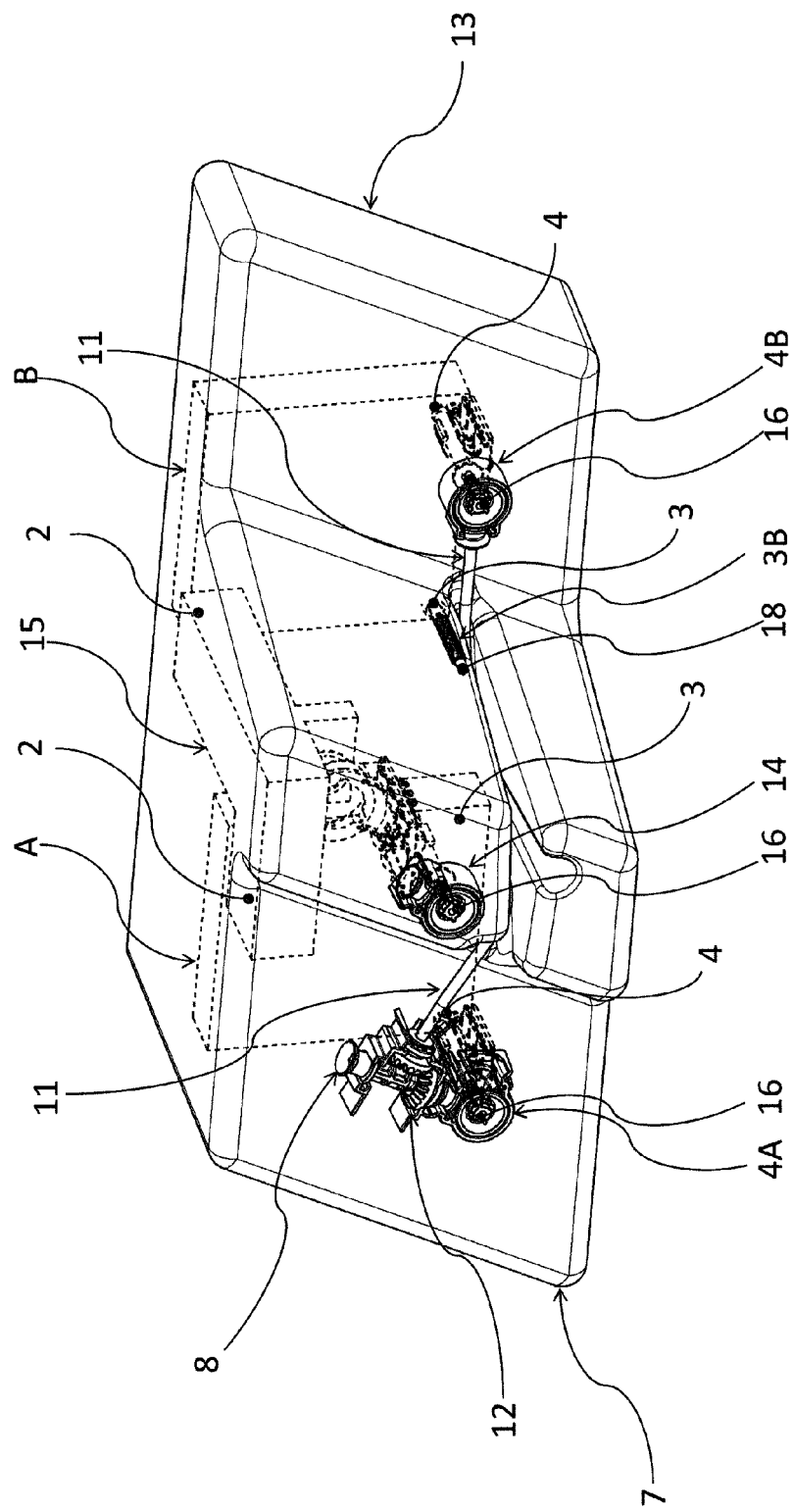
FIGS. 5 and 6a show a third embodiment of the adjustment system of optical assemblies according to the invention.
Figure 6A:
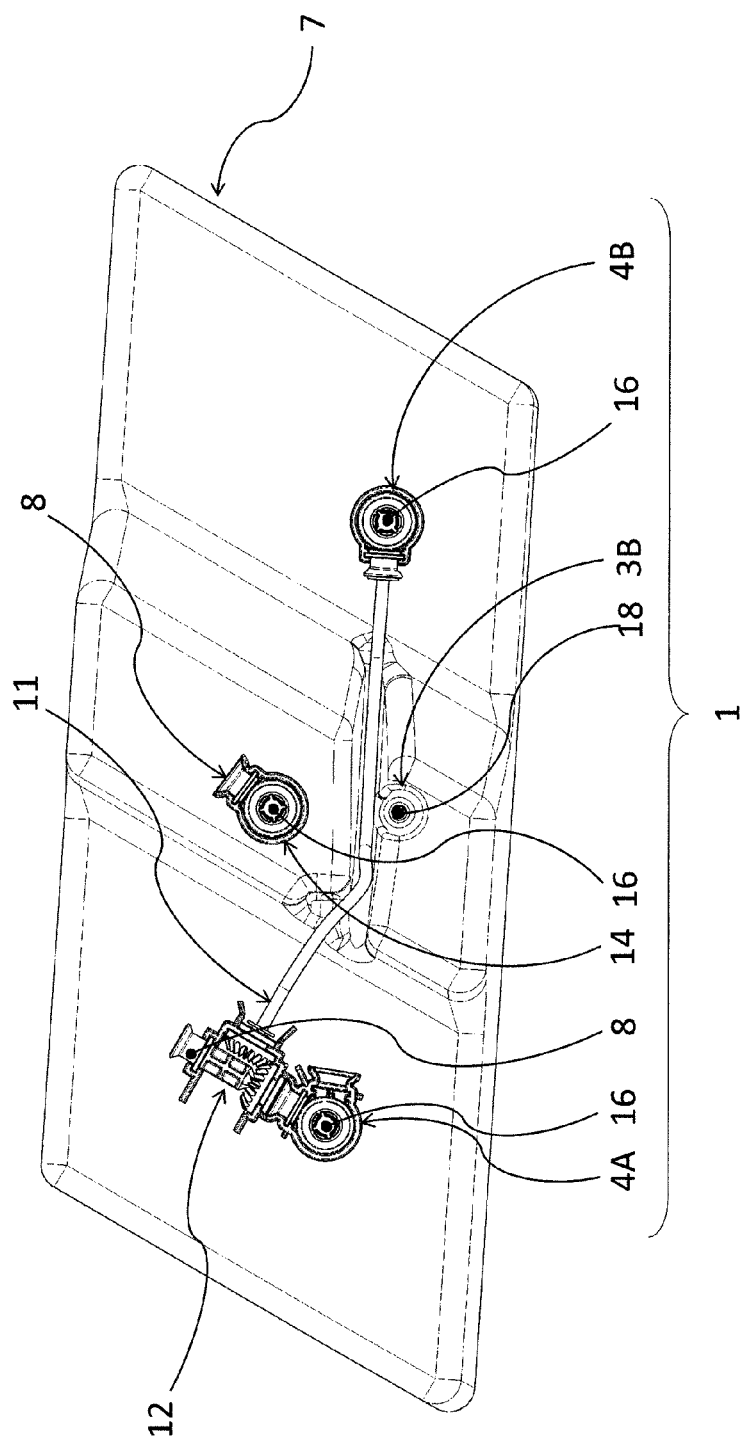

FIGS. 5 and 6a show a third embodiment of an adjustment system for optical assemblies designed especially for motor vehicle headlights. The carrier housing 7 forms an inner chamber of the light device, which is covered with a translucent cover 13 in the direction of the optical axis X. In the inner chamber of the housing 7, the light modules A, B are mounted whose position is adjustable by means of one adjustment system 1 wherein the control of the vertical system points 2 of both the light modules A, B is coupled to one common adjustment apparatus 14 by means of the connecting member 15. The fixed assembly node 3B, common adjustment apparatus 14, adjustment apparatuses 4A, 4B of both the light modules A, B and the additional adjustment apparatus 12 are equipped with respective control members 18, 16 and 8, led through the housing 7 into the outer space of the headlight. In the outer space of the headlight, there is also a removable connecting member 11 of the adjustment apparatuses 4A, 4B serving the purpose of turning the light modules A, B on the horizontal plane.

Figure 6B:
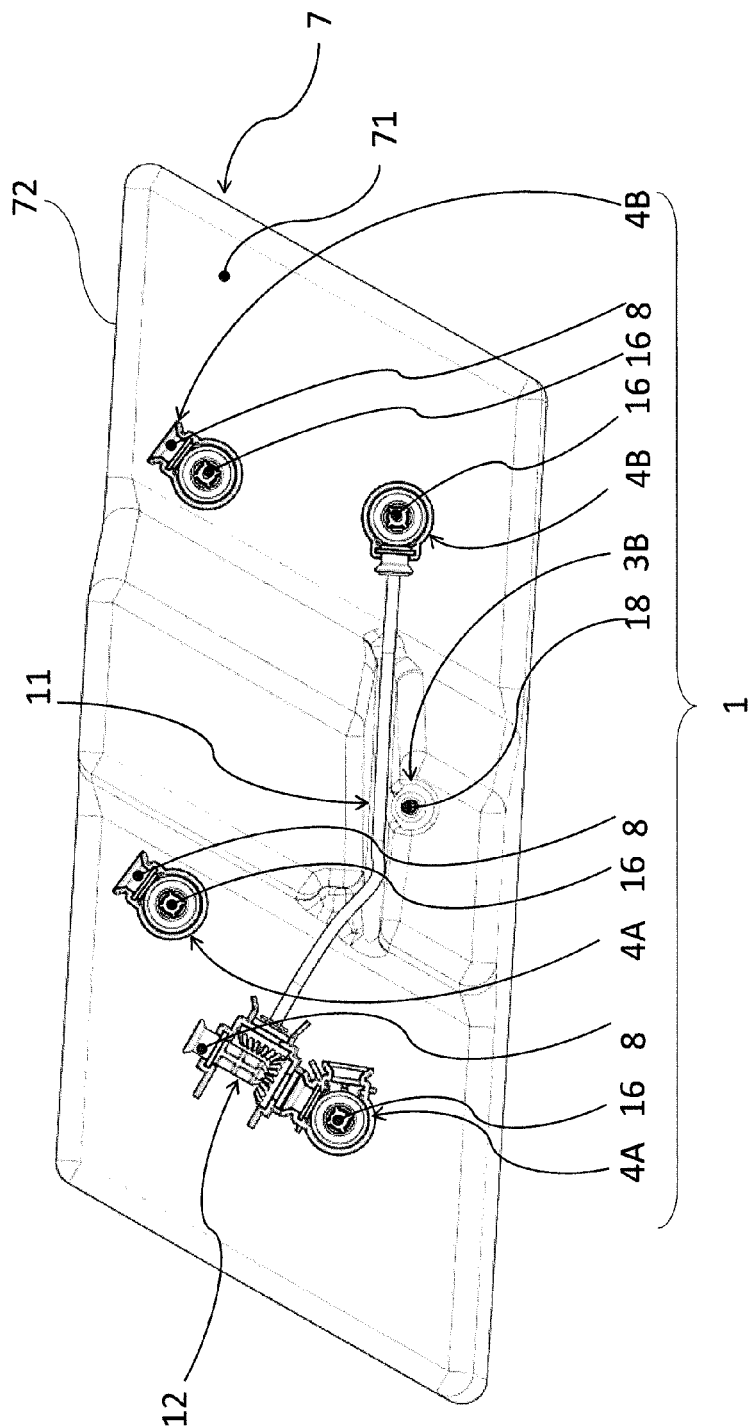
FIG. 6b shows another embodiment of the adjustment system of optical assemblies according to the invention.

FIG. 6b shows an embodiment of the adjustment system of the optical assembly comprising adjustment apparatuses 4A, 4B, a fixed assembly node 3B and an additional adjustment apparatus 12 fitted with the respective control members 16, 18 and 8 used to adjust the position of the lighting modules A, B, the control members 16 and 18 being accessible from a side of the rear face 71 of the housing 7 and the control member 8 from a side of the top face 72 of the housing 7.

FIGS. 7 and 8 show embodiments of the adjustment apparatuses 4A and 4B mutually connected by means of an additional adjustment apparatus 12 and a connecting member 11. The additional adjustment apparatus 12 comprises a shaft 9 that is fitted at one end with a control member 8 equipped with a socket for insertion of a control key. The shaft 9 is part of a converter 17 comprising three gears 171, 172, 173. The shaft 9 is fitted with a top gear 171 adapted for engagement with the gear 111 of the connecting member 11, and further with a bottom gear 172 adapted for engagement with the gear 173 of the adjustment apparatus 4A coupled to the control member 16. The gear 111 of the connecting member 11 is connected to a cable 112. The shaft 161 of the adjustment apparatus 4A is connected to a slider 19 through a thread 162. The slider 19 consists of a nut 181 and a central body 182 on the outwardly oriented end of which a ball journal 183 is situated. The respective light module A, B (not shown) is then fitted with a not shown ball seat where the journal 183 of the slider 19 is mounted to enable turning of the respective module A, B in all rotation stages.

Figure 9:
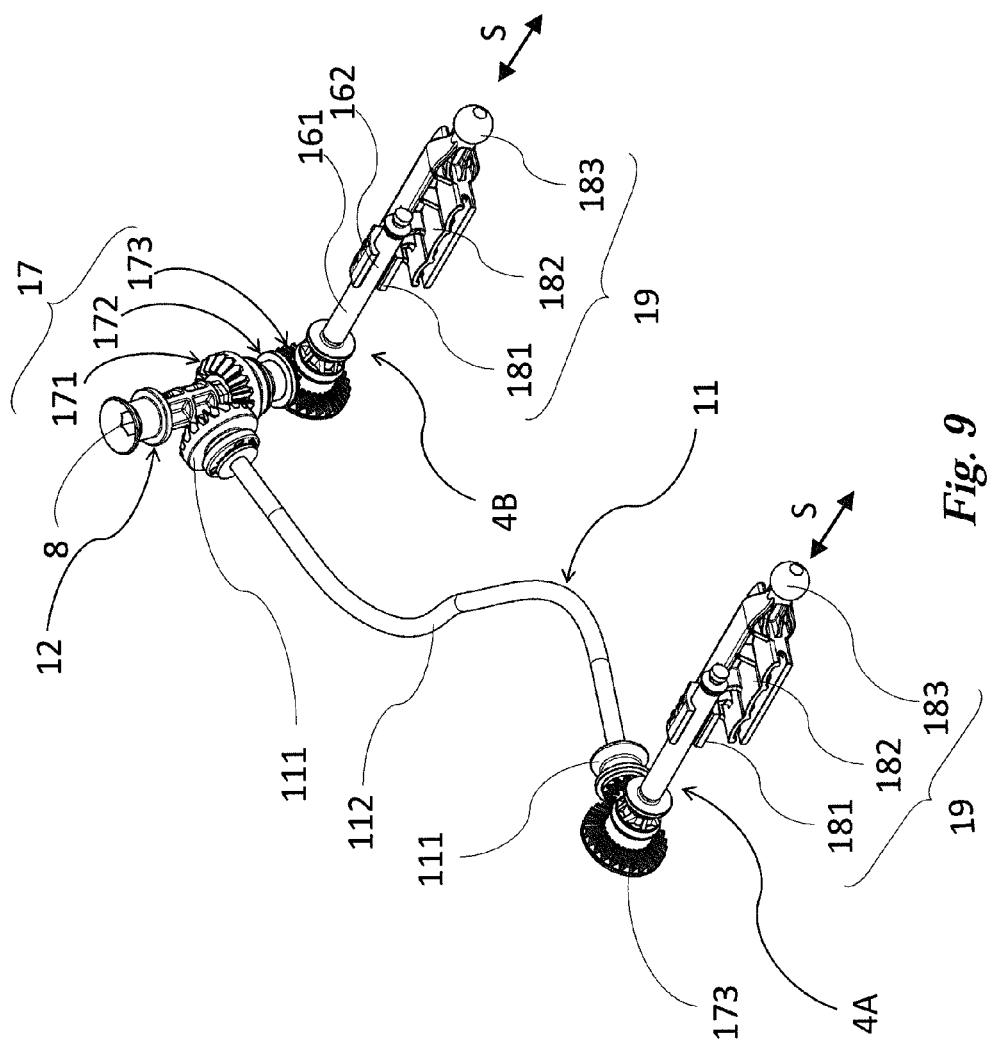
FIG. 9 shows more embodiments of the adjustment apparatuses according to the invention.

FIG. 9 shows embodiments of the adjustment apparatuses 4A and 4B wherein the adjustment apparatus 4B is in engagement with the additional adjustment apparatus 12, which is connected to the adjustment apparatus 4A by means of the connecting member 11 in a similar way as described above.

The arrows S in FIGS. 8 and 9 show the direction of execution of the linear reciprocal movement of the shafts 161 of the adjustment apparatuses 4A and 4B.

The optical assembly is adjusted in such a way that the control members 16 of the adjustment apparatus 4A are first used to ensure the required position of the light trace 10' of the first lighting module A. Then, the control members 16 of the adjustment apparatus 4B are used to ensure the required position of the light trace 10' of the second lighting module B. In one of the embodiments, the position of both the lighting modules A, B can be adjusted together with the use of the connecting member 15 adapted to create a common adjustment apparatus 14. This way, the optical system is adjusted during the production of the headlight and subsequently at least one of the pairs of adjustment apparatuses 4A, 4B gets connected by means of the connecting member 11. The connecting member 11 enables a cooperative change of the position of both the light modules A, B after installation of the headlight into the vehicle structure.

The invention advantageously makes it possible for the turning of the adjustment apparatus 4A, 4B, which the additional adjustment apparatus 12 is connected to, to be invoked either by turning of the additional adjustment apparatus 12 by means of its control member 8, or to be invoked directly by means of the control member 16 of this adjustment apparatus 4A, 4B. If this additional adjustment apparatus 12 is also connected to the second adjustment apparatus 4A, 4B by means of the connecting member 11, turning of the additional adjustment apparatus 12, and thus the adjustment apparatus 4A, 4B that the additional adjustment apparatus 12 is in engagement with, is advantageously caused by turning of the second adjustment apparatus 4A, 4B. The invention also makes it advantageously possible for the adjustment apparatus 4A, 4B to be in engagement with the additional adjustment apparatus 12 while at the same time this additional adjustment apparatus 12 does not have to be simultaneously connected to the other adjustment apparatus 4A, 4B by means of the connecting member 11. The additional adjustment apparatus 12 is not only connectable to the adjustment apparatus 4A, 4B, but it is also releasable from this connection, and also the connecting member 11 is not only connectable to the additional adjustment apparatus 12 and the second one of the adjustment apparatuses 4A, 4B, but it is also advantageously releasable from this connection.

The invention is not restricted to the embodiments that are disclosed above and shown in the drawings. E.g., depending on the type, size and shape design of the optical system and carrier bushing, this connecting member 11 may comprise a rod instead of the cable 112 and a different mechanism for torque transfer instead of the gear 111.

LIST OF REFERENCE MARKS

1—adjustment system
2—vertical system point
3—fixed system point
3A, 3B—fixed assembly node
4—horizontal system point
4A, 4B—adjustment apparatus
5—system triangle
6, 6A, 6B—optical assembly
7—carrier housing
8—control member
9—shaft
10—light ray
10'—light trace
11—connecting member
12—additional adjustment apparatus
13—translucent cover
14—common adjustment apparatus
15—connecting member
16—control member
17—converter
18—control member
19—slider
71—rear face
72—top face
111—gear
112—cable
161—shaft
162—thread
171—top gear
172—bottom gear
173—gear
181—nut
182—body
183—journal
α, β—turning axis
A—lighting module
B—lighting module HV—display plane
H—horizontal direction
S—arrow
V—vertical direction
X—optical axis
x, y, z—coordinates of the Cartesian coordinate system

The invention claimed is:

1. An adjustment system of optical assemblies designed for motor vehicle headlights, wherein each of the optical assemblies is part of a separate lighting module, the adjustment system comprising at least one pair of adjustment apparatuses, wherein for each of the optical assemblies, one adjustment apparatus is designed and adapted to turn the optical assembly around a turning axis ($\alpha$, $\beta$), the turning axis ($\alpha$, $\beta$) of one of the optical assemblies being substantially parallel to a corresponding axis ($\alpha$, $\beta$) of the other of the optical assemblies, wherein the adjustment system further comprises at least one additional adjustment apparatus that is connected to a first of the two adjustment apparatuses of a pair of adjustment apparatuses and adapted to transfer movement of the additional adjustment apparatus to the movement of the first adjustment apparatus, the adjustment system further comprising a longitudinal flexible connecting member that is connected to the additional adjustment apparatus and to a second of the two adjustment apparatuses and is adapted to transfer the movement of the additional adjustment apparatus through a twisting motion to the movement of the second of the adjustment apparatuses so that a turning of one optical assembly also causes simultaneous turning of the other optical assembly.

2. The adjustment system according to claim 1, wherein the said simultaneous turning of the optical assemblies is turning by the same angle.

3. The adjustment system according to claim 1, wherein the adjustment system comprises one pair of adjustment apparatuses and the turning axis ($\alpha$) is substantially horizontal.

4. The adjustment system according to claim 1, wherein the adjustment system comprises two pairs of adjustment apparatuses out of which one is adapted to turn the optical assemblies around substantially horizontal turning axes ($\alpha$) and the other one is adapted to turn them around substantially vertical turning axes ($\beta$).

5. The adjustment system according to claim 4, characterized in that the adjustment system comprises two connecting members.

6. The adjustment system according to claim 1, wherein the connecting member is also adapted to transfer the movement of the second one of the adjustment apparatuses to the movement of the additional adjustment apparatus.

7. The adjustment system according to claim 1, wherein the movement of the second one of the adjustment apparatuses and the movement of the additional adjustment apparatus is a rotary movement.

8. The adjustment system according to claim 7, wherein the connecting member is fitted with gears for the transfer of the rotary movement.

9. The adjustment system according to claim 1, wherein the connecting member is a cable.

10. The adjustment system according to claim 1, wherein the adjustment apparatus comprises a shaft equipped at one end with a control member that can be used to set the shaft into a rotary movement in a controlled manner, the shaft being further equipped with a gear designed to transfer the torque between the additional adjustment apparatus and this adjustment apparatus, or between the adjustment apparatus and the connecting member, and in its opposite part with a thread to transfer the rotary movement of the shaft to a linear reciprocal movement of a slider.

11. The adjustment system according to claim 10, wherein the slider comprises a nut and a central body at the outwardly oriented end of which a ball journal is situated to transfer the linear movement of the slider to a turning movement of the optical assembly around the turning axis ($\alpha$, $\beta$).

12. The adjustment system according to claim 1, wherein both the adjustment apparatuses of the pair of adjustment apparatuses have the same structure.

13. The adjustment system according to claim 12, wherein all the adjustment apparatuses included in the adjustment system have the same structure.

14. The adjustment system according to claim 1, wherein the additional adjustment apparatus comprises a shaft equipped with a top gear adapted to transfer a torque to the connecting member, and with a bottom gear adapted to transfer a torque to the gear of the adjustment apparatus, wherein the gear is coupled to a control member of the adjustment apparatus, and the additional adjustment apparatus is fitted at a top end of the additional adjustment apparatus with a control member for a controlled turning of the shaft.

* * * * *